(12) United States Patent  
Matsuo et al.

(10) Patent No.: US 9,656,683 B2
(45) Date of Patent: May 23, 2017

(54) VEHICLE STEERING WHEEL

(71) Applicant: Fuji Jukogyo Kabushiki Kaisha, Tokyo (JP)

(72) Inventors: Noriyoshi Matsuo, Tokyo (JP); Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 277 days.

(21) Appl. No.: 13/793,234

(22) Filed: Mar. 11, 2013

(65) Prior Publication Data

US 2013/0233114 A1 Sep. 12, 2013

(30) Foreign Application Priority Data

Mar. 12, 2012 (JP) .................................. 2012-053973

(51) Int. Cl.
 *B62D 1/04* (2006.01)
(52) U.S. Cl.
 CPC ......... *B62D 1/046* (2013.01); *Y10T 74/20256* (2015.01)
(58) Field of Classification Search
 CPC .......... B62D 1/046; B62D 1/04; B60Q 5/003; B60Q 1/1484; B60Q 1/0082
 See application file for complete search history.

(56) References Cited

U.S. PATENT DOCUMENTS

| | | | |
|---|---|---|---|
| 2,863,015 A * | 12/1958 | Ahrens | ....................... 200/61.54 |
| 5,335,743 A | 8/1994 | Gillbrand et al. | |
| 5,949,149 A * | 9/1999 | Shitanaka | ............ B60Q 1/0082 |
| | | | 200/5 R |
| 2001/0035337 A1* | 11/2001 | Liburdi | ....................... 200/61.54 |
| 2001/0054326 A1* | 12/2001 | Onodera et al. | ................. 74/552 |
| 2003/0023353 A1 | 1/2003 | Badarneh | |
| 2004/0050673 A1* | 3/2004 | Takahashi et al. | ......... 200/61.54 |

(Continued)

FOREIGN PATENT DOCUMENTS

| | | |
|---|---|---|
| EP | 1958849 A1 | 8/2008 |
| JP | 2003-175783 | 6/2003 |

(Continued)

OTHER PUBLICATIONS

Notification of Reasons for Refusal Feb. 4, 2014, which issued during prosecution of Japanese Application No. 2012-053973, which corresponds to the present application.

(Continued)

*Primary Examiner* — Daniel Yabut

(74) *Attorney, Agent, or Firm* — Troutman Sanders LLP

(57) ABSTRACT

There is provided a vehicle steering wheel including a circular rim, a grip forming a part of the rim and being held by a user, and input units formed inside the rim. Each input unit includes first and second input switches to be actuated by a pressing action of a user's thumb, and a third input switch provided between the first and second input switches to be actuated by a sliding action of the user's thumb on the third input switch while the user is holding the grip. The first input switch is located at a position of the user's thumb that can be placed without applying any force when the user is holding the grip. The second input switch is located at a lower position where the user's thumb can be placed without changing positions of other four fingers when the user is holding the grip.

5 Claims, 5 Drawing Sheets

(56) References Cited

U.S. PATENT DOCUMENTS

| | | |
|---|---|---|
| 2004/0108161 A1 | 6/2004 | Ohno |
| 2005/0021190 A1 | 1/2005 | Worrell et al. |
| 2005/0098417 A1 | 5/2005 | Miyako et al. |
| 2005/0167252 A1 | 8/2005 | Inoue et al. |
| 2007/0051597 A1 | 3/2007 | Hyun et al. |
| 2008/0143686 A1* | 6/2008 | Yeh et al. .................... 345/173 |
| 2008/0190681 A1* | 8/2008 | Mayser et al. ................ 180/170 |
| 2009/0140994 A1* | 6/2009 | Tanaka et al. ................ 345/173 |
| 2009/0164062 A1 | 6/2009 | Aoki |
| 2009/0223321 A1* | 9/2009 | Stefani .......................... 74/552 |
| 2010/0188343 A1* | 7/2010 | Bach ............................ 345/173 |
| 2010/0218641 A1* | 9/2010 | Neumann et al. .............. 74/552 |
| 2010/0250066 A1* | 9/2010 | Eckstein et al. ............... 701/41 |
| 2010/0268426 A1* | 10/2010 | Pathak et al. .................. 701/48 |
| 2010/0326229 A1* | 12/2010 | Gerharz ................ H01H 21/22 74/492 |
| 2011/0062010 A1* | 3/2011 | Onaka .......................... 200/5 C |
| 2011/0109112 A1* | 5/2011 | Jenny et al. ................. 296/1.08 |
| 2011/0132731 A1 | 6/2011 | Bowman et al. |
| 2011/0169750 A1* | 7/2011 | Pivonka et al. ............... 345/173 |
| 2011/0241850 A1* | 10/2011 | Bosch et al. ................ 340/384.6 |
| 2012/0096979 A1* | 4/2012 | Trujillo Linke ................ 74/552 |

FOREIGN PATENT DOCUMENTS

| | | | |
|---|---|---|---|
| JP | 2003-175783 A | 6/2003 | |
| JP | 2004-210196 | 7/2004 | |
| JP | 2006-179336 | 7/2006 | |
| JP | 2007-153181 | 6/2007 | |
| JP | 2007-153181 A | 6/2007 | |
| JP | EP 1859992 A1 * | 11/2007 | .......... B60Q 1/1484 |
| JP | 2009-161025 A | 7/2009 | |
| JP | 2009-248956 | 10/2009 | |

OTHER PUBLICATIONS

Decision of Grant dated Aug. 19, 2014, which issued during prosecution of Japanese Application No. 2012-053973, which corresponds to the present application.

U.S. Appl. No. 13/793,234 Office Action dated Feb. 24, 2015.

* cited by examiner

VEHICLE STEERING WHEEL

CROSS REFERENCES TO RELATED APPLICATIONS

The present application claims priority from Japanese Patent Application No. 2012-053973 filed on Mar. 12, 2012, the entire contents of which are hereby incorporated by reference.

BACKGROUND OF THE INVENTION

1. Field of the Invention

The present invention relates to a vehicle steering wheel having input units.

2. Description of the Related Art

Recently, vehicle steering wheels have been provided with various kinds of buttons for setting various operations such as a traveling mode setting, a car navigation setting, an audio playback and stop setting, an audio sound level setting, an air conditioner setting.

For example, in an onboard device operation system disclosed in Japanese Unexamined Patent Application Publication (JP-A) No. 2003-175783, an operation unit is provided on spokes of a steering wheel. The system allows a driver to perform a blind operation by displaying the driver's selected operation near the driver's line of sight when driving.

In JP-A No. 2007-153181, a ring-like steering wheel is provided with a palm-rest unit with which the palm of a driver's hand is in contact and is provided with an operation unit with which onboard devices can be operated with the driver's palm being in contact with the palm-rest unit.

JP-A No. 2009-161025 discloses a configuration in which a protrusion is provided on an upper part of a spoke of a steering wheel and a switch is provided on the protrusion in order to allow the operation of the switch provided on the steering wheel without gripping the switch.

However, the configuration disclosed in the above Japanese Unexamined Patent Application Publications cannot realize a safe and sufficiently satisfactory operability from the viewpoint of a response to a driver's acceleration operation. In particular, it is preferable in a sports car to allow a driver to perform the acceleration operation while holding the steering wheel and without the driver having to move ones hand off the steering wheel.

SUMMARY OF THE INVENTION

In view of the above problems, the present invention aims to provide a vehicle steering wheel that ensures safety and has sufficiently satisfactory operability from the viewpoint of a response to an acceleration operation.

An aspect of the present invention provides a vehicle steering wheel including: a circular rim; a grip forming a part of the rim and being configured to be held by a user (driver); and input units formed inside the rim. Each of the input units includes a first input switch to be actuated by a pressing action of the user's thumb, a second input switch to be actuated by a pressing action of the user's thumb, and a third input switch provided between the first input switch and the second input switch, the third input switch being configured to be actuated by a sliding action of the user's thumb on the third input switch while the user is holding the grip. The first input switch is located at a position of the user's thumb that can be placed without having to apply any force when the user is holding the grip. The second input switch is located at a lower position where the user's thumb can be placed without having to change the positions of the other four fingers when the user is holding the grip.

Preferably, the third input switch has a flat surface and the flat surface can detect an up-and-down movement of the user's thumb.

Preferably, the first and second input switches are button shaped. The third-input-switch side of the first input switch projects further forward (toward the user) than the flat surface of the third input switch. The third-input-switch side of the second input switch projects further forward (toward the user) than the flat surface of the third input switch.

Preferably, a pressing direction of the first input switch and a pressing direction of the second input switch are set to be at either one of a right angle and an obtuse angle with respect to the flat surface of the third input switch.

DESCRIPTION OF THE PREFERRED EMBODIMENTS

Figure 1:
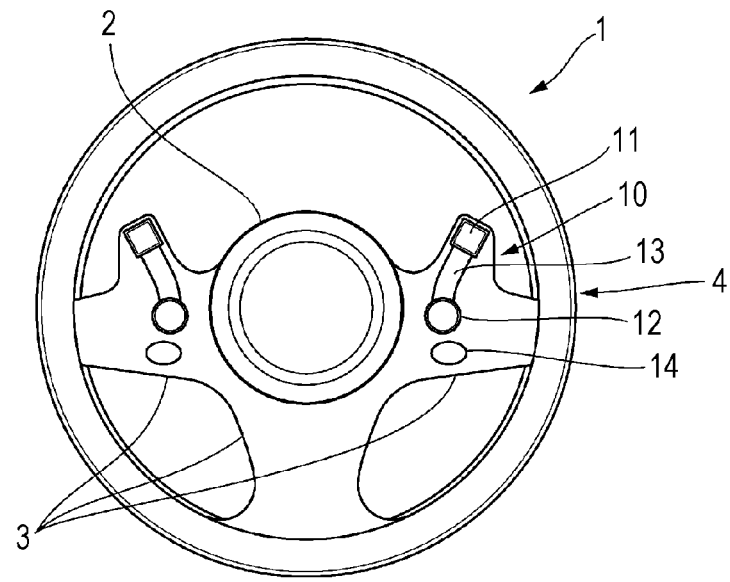
FIG. 1 is a plan view of a vehicle steering wheel according to an embodiment of the present invention.
Figure 2:
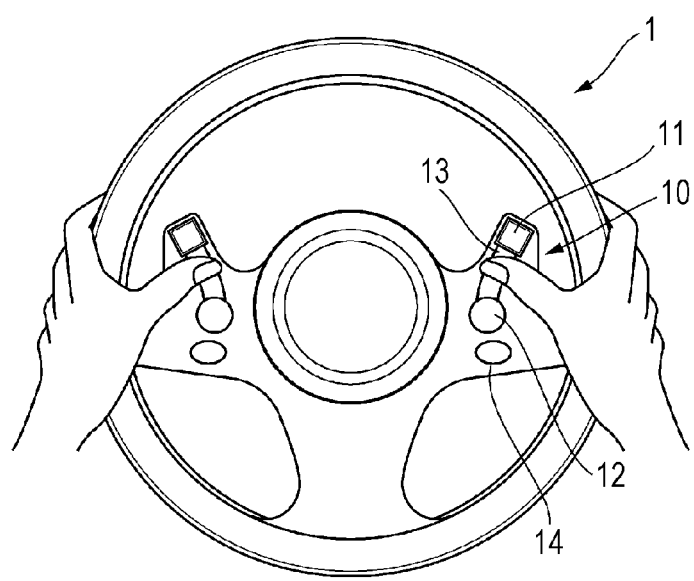
FIG. 2 is a plan view of the vehicle steering wheel according to an embodiment of the present invention, illustrating a state in which a driver (user) is holding the vehicle steering wheel according to an embodiment of the present invention.

FIGS. 1 and 2 show an embodiment of a vehicle steering wheel of the present invention. The basic embodiment of the present invention will be described below with reference to FIGS. 1 and 2.

FIG. 1 is a plan view of a vehicle steering wheel 1 according to an embodiment of the present invention. The vehicle steering wheel 1 includes a circular rim, a central hub 2 containing an air bag therein, and spokes 3.

The vehicle steering wheel 1 has the spokes 3 that extend from the hub 2 to the rim in the right and left directions and in the downward direction. An input unit 10 is provided on each of the right and left spokes 3. Each input unit 10 is located on a corresponding one of the spokes 3 at a position at which a thumb of a driver (user) can move naturally to apply an input to the input unit 10 when the user is holding a grip 4 of the rim of the vehicle steering wheel 1.

Each input unit 10 includes a first input switch 11, a second input switch 12, a third input switch 13, and a fourth input switch 14. The first, second, and fourth input switches 11, 12, and 14 are button-shaped.

FIG. 2 is a plan view of the vehicle steering wheel 1 according to the embodiment, illustrating a state in which the user is holding the wheel 1.

The first input switch 11 is located on the spoke 3 at a position at which the user's thumb can be placed without applying any force, when the user is holding the grip 4 of the rim of the vehicle steering wheel 1. In addition, the side of the first input switch 11 that is nearer the third input switch 13 projects further forward (toward the user) than the flat surface of the third input switch 13.

The second input switch 12 is located on the spoke 3 at a position at which the user's thumb can be placed without having to change the position of the other four fingers on the grip 4, when the user is holding the grip 4 of the rim of the vehicle steering wheel 1. In addition, the side of the second input switch 12 that is nearer the third input switch 13 projects further forward (toward the user) than the flat surface of the third input switch 13.

The first input switch 11 has a quadrangle shape. The second input switch 12 has a circular shape. The fourth input switch 14 has an oval shape. Thus, the user can easily operate the input units 10 intuitively without having to look at them.

The third input switch 13 is disposed between the first input switch 11 and the second input switch 12 on the spoke 3 and is a slide-type switch. This slide-type switch (third input switch 13) may use either of a capacitance system, an infrared radiation system, a surface elastic wave system, an electrical resistance membrane system, and an electromagnetic induction system. In the present invention, the capacitance system which is low in error is adopted.

The third input switch 13 determines a level of input by detecting a movement of the user's thumb on the flat surface.

Figure 3:
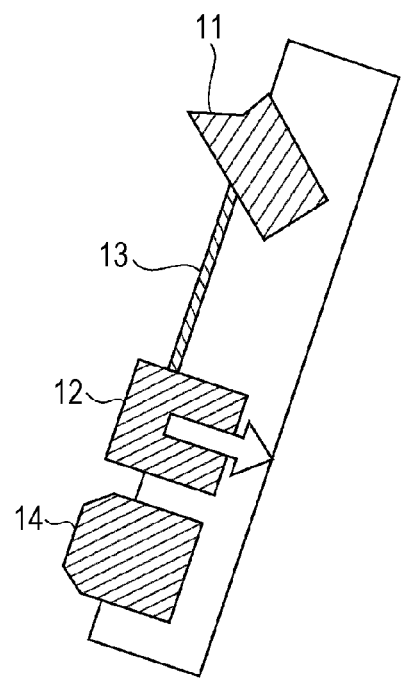
FIG. 3 is an enlarged sectional view of a part of the vehicle steering wheel according to a first embodiment of the present invention.

FIG. 3 is an enlarged sectional view of a part of the vehicle steering wheel 1 according to a first embodiment of the present invention. The first input switch 11 projects forward (toward the user) with respect to the flat surface of the third input switch 13 at an obtuse angle with respect to the flat surface. The second input switches 12 projects at a right angle with respect to the flat surface of the third switch input 13. The fourth input switch 14 projects at a right angle with respect to the flat surface of the third switch input 13, as in the case of the second input switch 12.

The side of the first input switch 11 that is nearer the third input switch 13 projects further than the other side of the switch 11 at the upper side of the vehicle steering wheel 1, viewed from the user. Thus, it is possible to prevent the user from pressing the first input switch 11 accidentally instead of the third switch 13 when the user operates the steering wheel.

The second input switch 12 is disposed perpendicularly to the flat surface of the third input switch 13. The second input switch 12 is actuated when the user's thumb pushes the second input switch 12 downward in a direction perpendicular to the flat surface of the third input switch 13.

The fourth input switch 14 is located on the spoke 3 at a position where the user's thumb can move smoothly on the spoke 3 when the user is holding the grip 4. This location will make it slightly difficult to operate the switch difficult.

However, it is possible to use the fourth input switch 14 as an important button in view of safety when the user is holding the vehicle steering wheel 1, since the user must be careful when pressing the fourth input switch 14.

Figure 4:
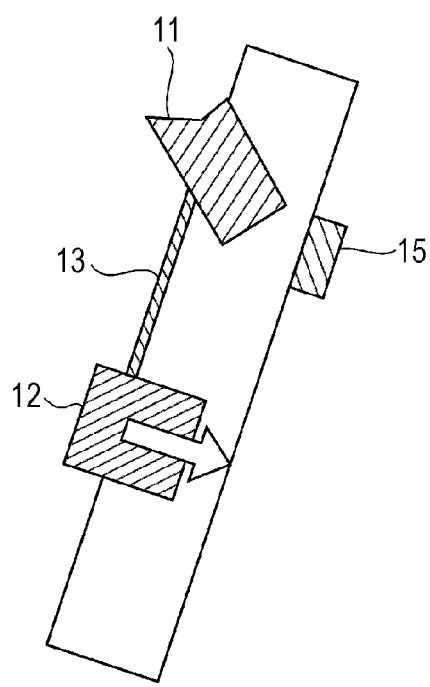
FIG. 4 is an enlarged sectional view of a part of the vehicle steering wheel according to a second embodiment of the present invention.

FIG. 4 is an enlarged sectional view of a part of the vehicle steering wheel 1 according to a second embodiment of the present invention. The first input switch 11, the second input switch 12, and the third input switch 13 in the second embodiment are respectively disposed at the same positions as the first input switch 11, the second input switch 12, and the third input switch 13 in the first embodiment of the vehicle steering wheel 1. In the vehicle steering wheel 1 in the second embodiment, a fifth input switch 15 is provided instead of the fourth input switch 14 of the vehicle steering wheel 1 in the first embodiment.

The fifth input switch 15 is located on the spoke 3 at a position where the user's forefinger can operate the switch 15 when the user is holding the grip 4. The fifth input switch 15 has the same function as the fourth input switch 14.

According to the above disposition, it is possible to prevent the user from pressing the fifth input switch 15 accidentally, since the user cannot press the fifth input switch 15 unknowingly when only moving the user's thumb. The user must make a conscious effort to move their forefinger and must press the fifth input switch 15 in order to press the fifth input switch 15, thereby enhancing safety for important operations.

Figure 5:
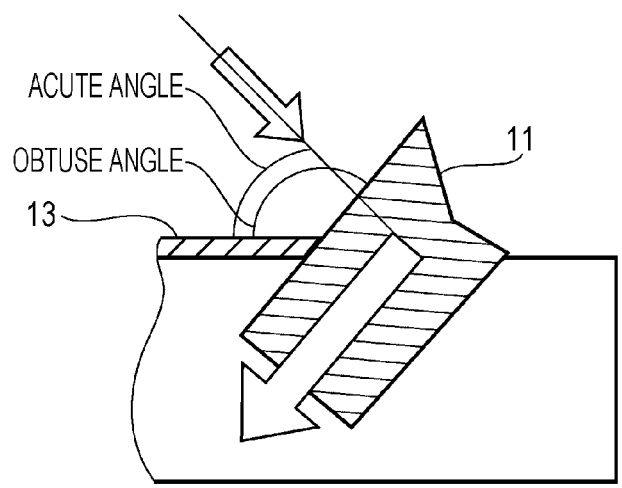
FIG. 5 is an enlarged sectional view of a first input switch of the vehicle steering wheel according to an embodiment of the present invention.

FIG. 5 is an enlarged sectional view of the first input switch 11 of the vehicle steering wheel 1 according to an embodiment of the present invention. The first input switch 11 projects frontward (toward the user) at an obtuse angle with respect to the flat surface of the third input switch 13. The first input switch 11 is pressed downward in a direction at an obtuse angle relative to the flat surface of the third input switch 13. Thus, even if the user attempts to press the first input switch 11 in a direction at an acute angle relative to the flat surface of the third input switch 13, the first input switch 11 cannot be operated.

Figure 6:
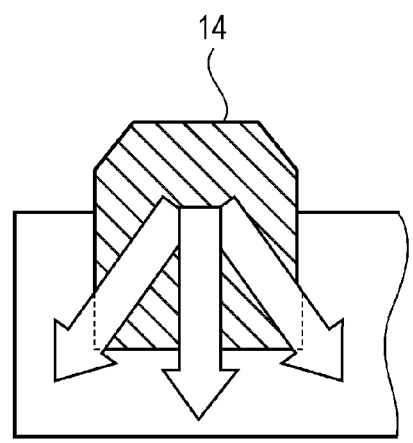
FIG. 6 is an enlarged sectional view of a fourth input switch of the vehicle steering wheel according to an embodiment of the present invention.

FIG. 6 is an enlarged sectional view of the fourth input switch 14 of the vehicle steering wheel 1 according to an embodiment of the present invention. The fourth input switch 14 projects at a right angle relative to the flat surface of the third input switch 13.

Figure 7:
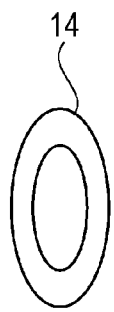
FIG. 7 is an enlarged view of a head of the fourth input switch of the vehicle steering wheel according to an embodiment of the present invention.

FIG. 7 is an enlarged view of a head of the fourth input switch 14 of the vehicle steering wheel 1 according to an embodiment of the present invention. The head of the fourth input switch 14 is chamfered diagonally so as to be easily urged from any direction (see arrows in FIG. 6). Thus, the user can readily press the fourth input switch 14 repeatedly.

Figure 8A:
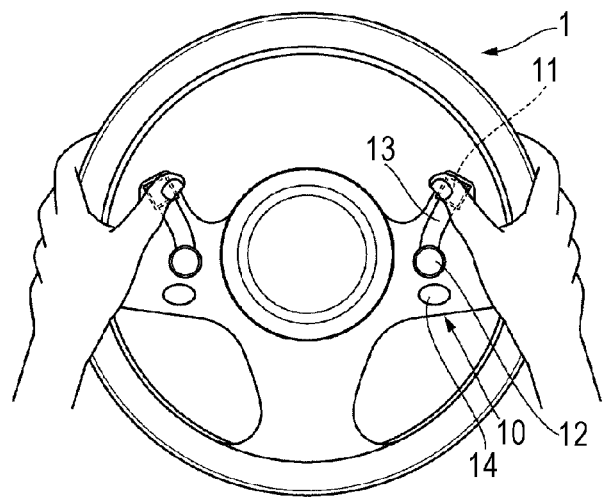
FIG. 8A to FIG. 8C are plan views similar to FIG. 2, illustrating a state in which a driver (user) is using the vehicle steering wheel according to an embodiment of the present invention.
Figure 8B:
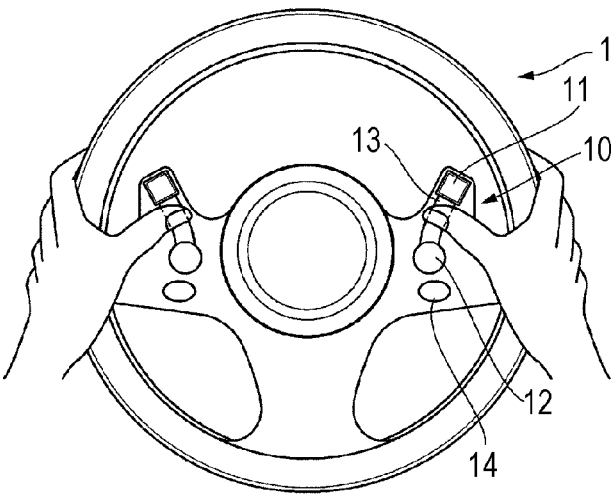
Figure 8C:
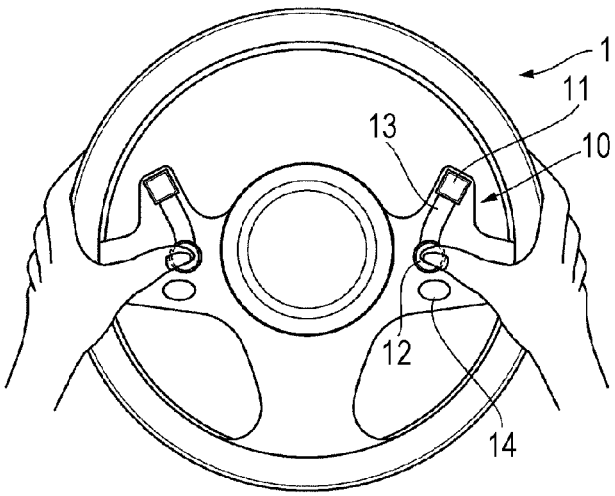

FIG. 8A to FIG. 8C are plan views, illustrating a state in which the user is using the vehicle steering wheel 1 according to an embodiment of the present invention. FIG. 8A shows a state in which the user has their thumb on the first input switch 11. FIG. 8B shows a state in which the user has their thumb on the third input switch 13. FIG. 8C shows a state in which the user has theirs thumb on the second input switch 12.

In the case where the user has their thumb on the second input switch 12, the position of the thumb corresponds to a lower end position where the thumb can be placed without having to change the position of the user's other four fingers located on the grip 4 of the vehicle steering wheel 1 when the user is holding the grip 4. Consequently, in order for the user to press down on the fourth input switch 14, the user must forcibly move their thumb onto the fourth input switch 14 in the case where the user is holding the grip 4 of the vehicle steering wheel 1.

Figure 9:
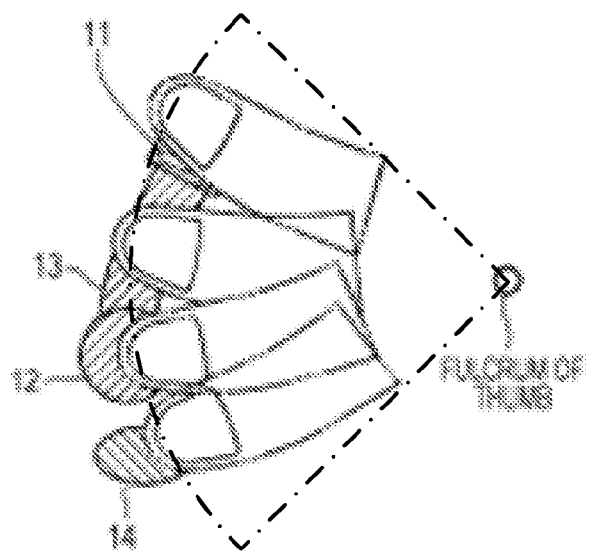
FIG. 9 is an enlarged plan view of an input unit of the vehicle steering wheel according to an embodiment of the present invention, illustrating a state in which a driver (user) is using the unit.

FIG. 9 is an enlarged plan view of an input unit 10 of the vehicle steering wheel 1 according to an embodiment of the present invention, illustrating a state in which a user is using the unit 10. Using the fulcrum of the thumb as a reference, the positional relationship among the input switches 11, 12, 13, and 14 in the present invention will be described below.

The first input switch 11 is located with respect to the fulcrum of the user's thumb at a position to which the thumb can move upward naturally and easily within a comfortable area when the user is holding the grip 4 of the vehicle steering wheel 1.

The second input switch 12 is located with respect to the fulcrum of the user's thumb at a position to which the thumb can move downward naturally and easily within a comfortable area when the user is holding the grip 4 of the vehicle steering wheel 1.

The third input switch 13 is located with respect to the fulcrum of the user's thumb at a position to which the user's thumb can move upward and downward naturally, and easily within a comfortable area when the user is holding the grip 4 of the vehicle steering wheel 1. The third input switch 13 is disposed between the lower side of the first input switch 11 and the upper side of the second input switch 12.

The fourth input switch 14 is located with respect to the fulcrum of the thumb at a position to which the user's thumb can move downward with slight effort when the user is holding the grip 4 of the vehicle steering wheel 1. For example, the fourth input switch 14 is disposed below the second input switch 12 and is spaced apart from the switch 12 by a thumb width.

The first, second, third, and fourth input switches 11, 12, 13, and 14 are located on an arcuate line that indicates the movement path of the thumb. In particular, the third input switch 13 is oriented along the arcuately curved line along the movement path of the thumb.

Figure 10:
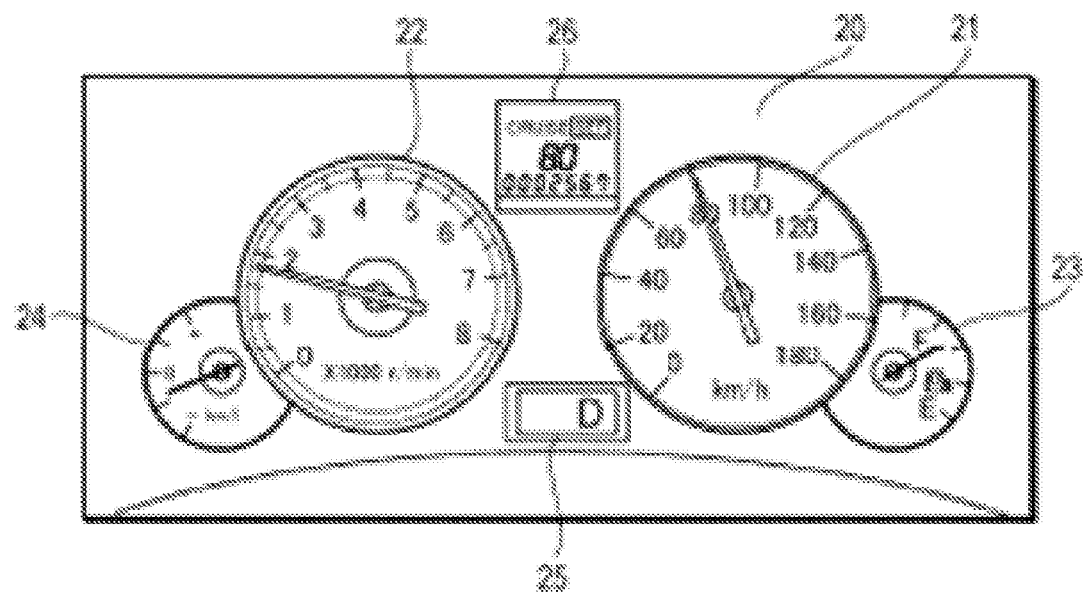
FIG. 10 is a plan view of a vehicle display according to an embodiment of the present invention.

Next, referring now to a display board 20 in FIG. 10, an operation of the input units 10 in an embodiment of the present invention will be specifically described.

The display board 20 physically or electrically displays a speed meter 21, an engine tachometer 22, a fuel meter 23, a fuel economy gauge 24, a shift position indicator 25, and a driving indicator 26. The speed meter 21 indicates a speed in an analogue manner while the engine tachometer 22 indicates an engine speed in an analogue manner.

The fuel meter 23 indicates the amount of fuel remaining in a fuel tank of a vehicle. The fuel economy gauge 24 has a needle that shifts toward a plus side or a minus side on the basis of the average amount of fuel calculated by a traveling history of a user. The shift position indicator 25 indicates a current shift position selected by a user through a shift-operation.

The driving indicator 26 indicates a vehicle speed, a traveling distance, a drive mode, and the like.

There are three drive modes in the embodiment that are associated with a combination of an output characteristic of an engine and a control pattern of a transmission. For example, there are a fuel economy emphasis mode A, a traveling mode B that takes into consideration fuel economy and an accelerator response, and an accelerator response emphasis mode C.

These modes realize a performance that complies with user's demands by means of a plurality of output performances and control patterns set in an engine control unit (ECU) and a transmission control unit (TCU) for an automatic vehicle. For example, in the case where a user can comfortably drive a vehicle in an urban area or for long distance traveling, a smooth and practical output characteristic is set by the mode A, thereby realizing excellent fuel economy.

Furthermore, in the embodiment, an advanced driver assistance system (ADAS) is installed in a vehicle. The ADAS can control an automatic braking operation in response to detection of a collision, a speed control operation that is executed on the basis of the speed of a preceding vehicle, and a control operation that controls a distance between a preceding vehicle and a trailing vehicle. When an obstacle that may cause a collision is detected in front of a vehicle, an automatic braking operation is systematically performed. to the ADAS can realize a driving assistance mode, that is, a drive mode for following a preceding vehicle while maintaining a constant distance between the vehicles, and can control a speed setting and the distance between the vehicles.

A function of the input units 10 of the vehicle steering wheel 1 according to an embodiment of the present invention will be described below in connection with a vehicle having the above drive mode and the driving assistance mode.

The first input switch 11 serves as a button for changing the drive mode. An input from the first input switch 11 allows a progressive operation of the drive mode. For example, it is possible to change the drive mode sequentially from the mode A through the mode B, the mode C, and the driving assistance mode to the mode A.

The drive mode is selected by performing input with the second input switch 12. The mode is released by pressing the fourth input switch 14 or the fifth input switch 15.

The selected mode is displayed on the driving display 26 in response to selection of the mode. When a vehicle following mode is selected and is set, the expression "CRUISE SET" is displayed on the driving display 26.

When a vehicle is running at 40 km/h upon selection of the driving assistance mode, the current vehicle speed is set as a constant speed. The vehicle runs at the constant speed unless the user steps on the accelerator pedal or the brake pedal. The constant speed can be changed by sliding the user's thumb on the third input switch 13, namely the slide switch. It is not necessary to apply an input to the second input switch 12 which has a function of confirming a selection.

When the user's thumb moves the slide switch, namely the third input switch 13 upward, the speed increases. When the user's thumb moves the slide switch downward, the speed decreases.

When a user of is selecting the driving assistance mode and there appears a preceding vehicle, the user's vehicle follows the preceding vehicle while maintaining a constant distance therefrom. The constant distance between the vehicles can be changed by moving the user's thumb on the third input switch 13, namely, the slide switch. It is not necessary to apply an input to the second input switch 12 which has a function of confirming a selection.

When the user's thumb moves the slide switch upward, the distance between the vehicles increases. When the user's thumb moves the slide switch downward, the distance between the vehicles decreases.

In the above example, the vehicle speed and the distance between the vehicles is changed only with the third input switch 13, namely, the slide switch. However, the vehicle speed and the distance between the vehicles may be changed by tapping the second input switch 12 repeatedly. For example, the vehicle speed may be increased by tapping the second input switch 12 repeatedly after selecting the driving assistance mode.

The above description refers to the drive mode as an example. However, since each input unit 10 is provided on the right and left sides of the vehicle steering wheel 1, for example, the respective input switches of the left side input unit 10 can be used for functions other than the selection or the adjustment of the drive mode. For example, the first input switch 11 may be used as a selection button for an audio playback mode or an audio stop mode, and the second input switch 12 may be used to select one of an audio sound level mode and a playback mode. The third input switch 13 may be used to adjust a sound level in the sound level mode while the third input switch 13 may be used to adjust a fast-forwarding function or a reversing function in the playback mode. Similarly, the third input switch may be used to skip music tracks in the music selection mode.

Further, control of an air-conditioner can be performed in the same manner as the above example. For instance, the first input switch 11 may be used as a selection button for setting an air amount or a temperature, and the second input switch 12 may be used to select one of an air amount mode and a temperature-setting mode. The third input switch 13 may be used to adjust the air amount in the air amount mode while the third input switch 13 may be used to adjust the temperature set in the temperature-setting mode.

Furthermore, control of a car navigation system can be performed, in the same manner as the above example. For instance, the first input switch 11 may be used as a setting button for specifying a destination, and the second input switch 12 may be used to select one of destinations. The third input switch 13 may be used to adjust a magnification scale of a map when the map is being displayed.

The above functions may be implemented in either one of the right side input unit 10 and the left side input unit 10 in the vehicle steering wheel 1 of the present invention. Another switch button (not shown) may be used to change the functions of the input units 10. For example, the function of the left side input unit 10 in the vehicle steering wheel 1 of the present invention may be changed from a function of controlling the air conditioner to a function of controlling an audio system.

The vehicle steering wheel 1 according to the embodiments of the present invention includes a circular rim, a grip 4 forming a part of the circular rim and being held by a user (driver), and input units 10 formed inside the circular rim. Each of the input units 10 includes a first input switch 11 to be actuated by a pressing action of the user's thumb, a second input switch 12 to be actuated by a pressing action of the user's thumb, and a third input switch 13 provided between the first input switch 11 and the second input switch 12 to be actuated by a sliding action of the user's thumb on the third input switch while the user is holding the grip. The first input switch 11 is located at a position of the user's thumb that can be placed without having to apply any force when the user is holding the grip 4. The second input switch 12 is located at a lower position where the user's thumb can be placed without having to change the positions of the other four fingers when the user is holding the grip 4.

The above configuration can achieve safety and can obtain sufficiently satisfactory operability from the viewpoint of a response to an acceleration operation.

In the vehicle steering wheel 1 according to the embodiments of the present invention, the third input switch has a flat surface. The flat surface can detect an up-and-down movement of the user's thumb.

The above configuration allows easy adjustment of a vehicle speed by the user intuitively moving their thumb up and down.

The vehicle steering wheel 1 according to the embodiments of the present invention includes the first and second input switches having button-like configurations. The third-input-switch side of the first input switch projects further forward (toward the user) than the flat surface of the third input switch. The third-input-switch side of the second input switch projects further forward (toward the user) than the flat surface of the third input switch.

The above configuration can achieve a safe operation.

In the vehicle steering wheel 1 according to the embodiments of the present invention, a pressing direction of the first input switch and a pressing direction of the second input switch are set to be either one of at a right angle and an obtuse angle with respect to the flat surface of the third input switch.

The above configuration can achieve a safe operation.

What is claimed is:

1. A vehicle steering wheel comprising:
   a circular rim;
   a grip forming a part of the circular rim and being held by a user; and
   input units formed inside the circular rim, wherein each of the input units comprises:
     a first input switch to detect an input by a pressing action the first input switch located at a position within an area from the grip and located upward with respect to the grip;
     a second input switch to detect a second input by a pressing action, the second input switch located at a position within the area and located downward with respect to the grip and at least partially within a user-reach arc defined by a fulcrum on the grip and an arcuately curved line along a movement path encompassing at least part of the first input switch; and
     a third input switch longitudinally provided along an arcuate band which is convex relative to a center of the circular rim between the first input switch and the second input switch, to be actuated by a sliding action, and provided such that a first longitudinal end abuts the first input switch and a second longitudinal end abuts the second input switch;
   wherein:
     the first and second input switches are push-buttons;
     the third input switch has a flat surface and the flat surface detects an up-and-down movement;
     the third input switch is a sliding surface switch, wherein the sliding surface switch is one of a capacitance system, an infrared radiation system, a surface elastic wave system, an electrical resistance membrane system, and an electromagnetic induction system;
     a third-input-switch side of the first input switch projects further toward the user than the flat surface of the third input switch; and
     a third-input-switch side of the second input switch projects further forward than the flat surface of the third input switch.

2. The vehicle steering wheel according to claim 1, wherein
   a pressing direction of the first input switch and a pressing direction of the second input switch are set to be at either one of a right angle and an obtuse angle with respect to the flat surface of the third input switch.

3. The vehicle steering wheel according to claim 1 further comprising
a spoke connecting the circular rim to a center of the steering wheel;
a fourth input switch to detect a fourth input by a pressing action, the fourth input switch located on an underside of the spoke, wherein the underside of the spoke is opposite the first, second, and third input switches, wherein the fourth input switch is configured to release a driving mode of a vehicle steered by the steering wheel.

4. The vehicle steering wheel according to claim 1, wherein
a sliding action actuating the third input switch changes a vehicle constant speed, when a vehicle steered by the vehicle steering wheel is driving in a driving assistance mode.

5. The vehicle steering wheel according to claim 1, wherein
a sliding action actuating the third input switch changes a constant following distance between a vehicle steered by the vehicle steering wheel and a preceding vehicle, when the vehicle steered by the vehicle steering wheel is driving in a driving assistance mode.

* * * * *